Dec. 29, 1925.  1,567,048
J. H. GILLIS
APPARATUS FOR MAKING ROOFING ELEMENTS
Filed Sept. 10, 1923     4 Sheets-Sheet 1
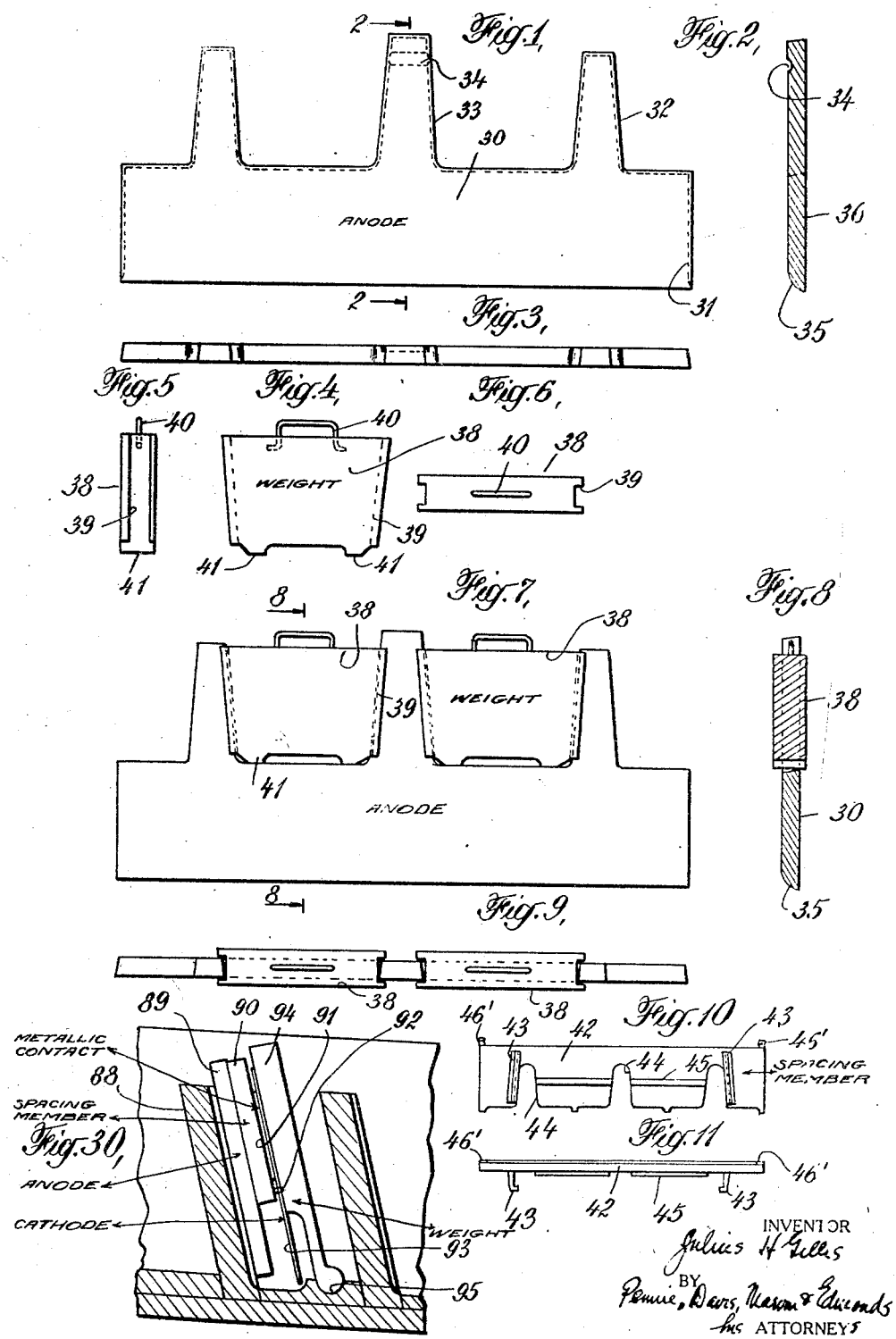

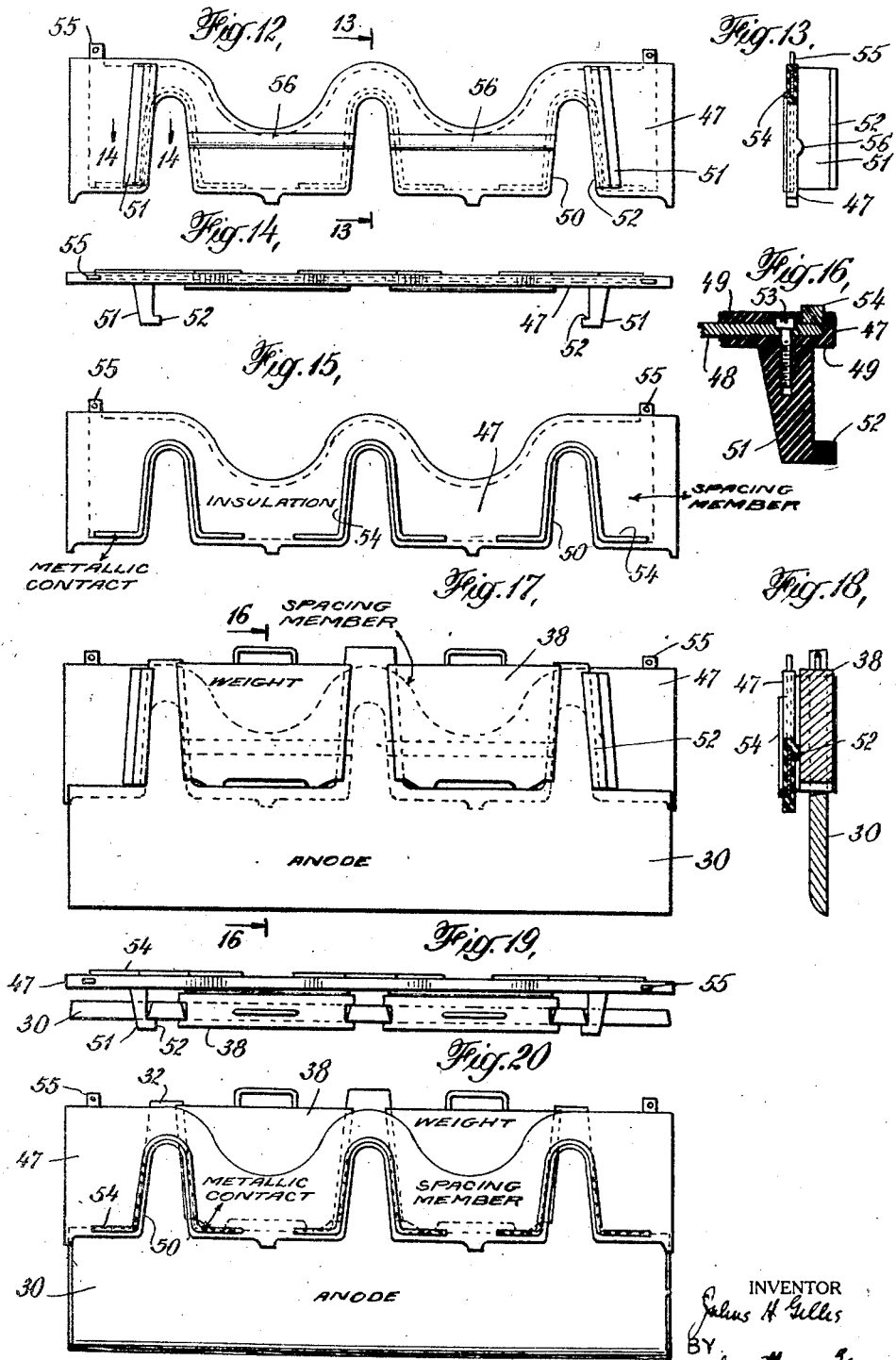

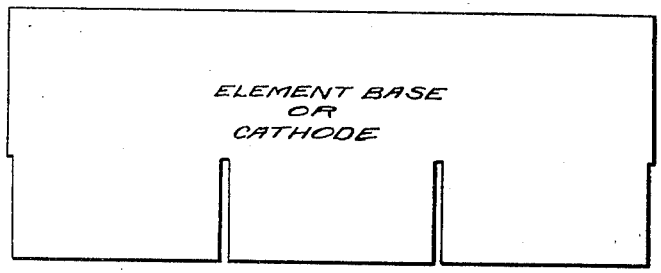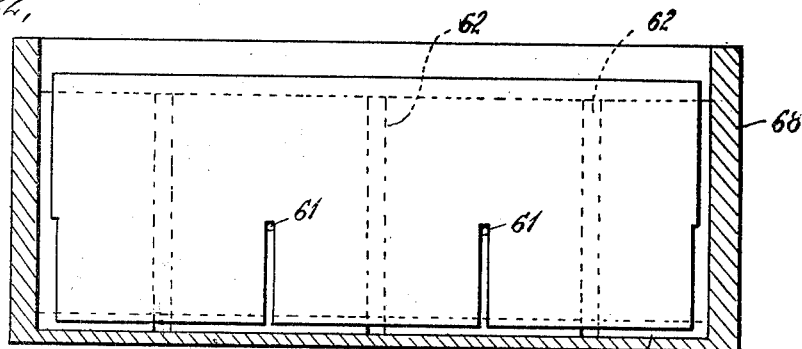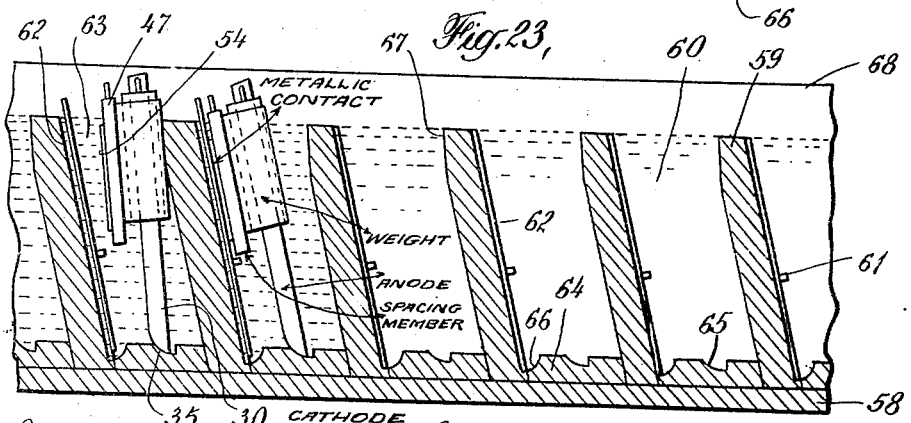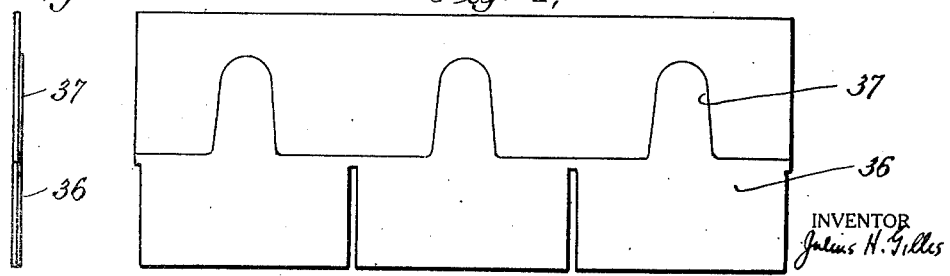

Dec. 29, 1925.
J. H. GILLIS
1,567,048
APPARATUS FOR MAKING ROOFING ELEMENTS
Filed Sept. 10, 1923     4 Sheets-Sheet 4
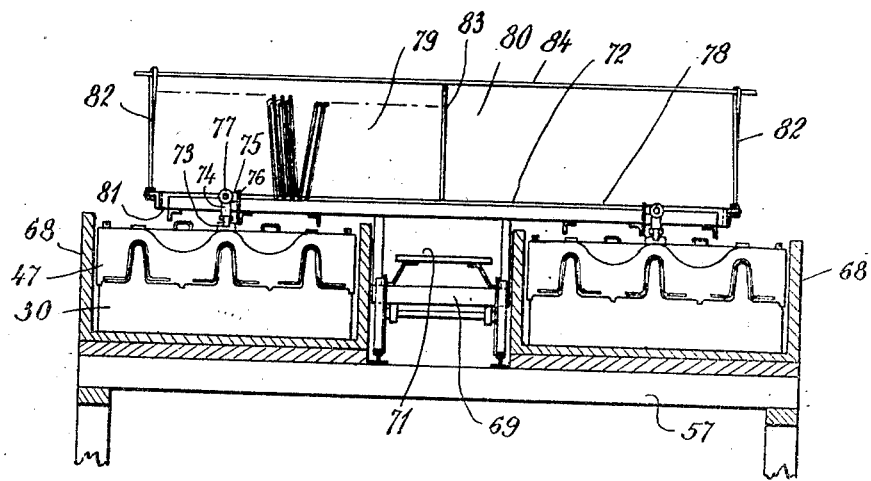
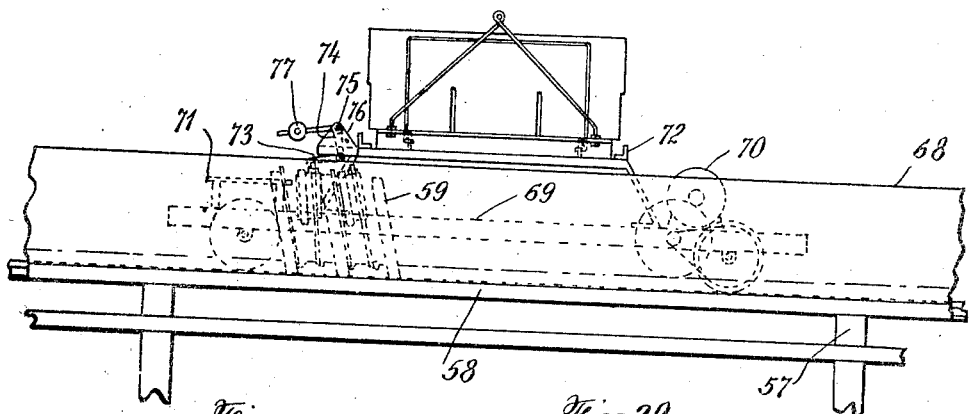
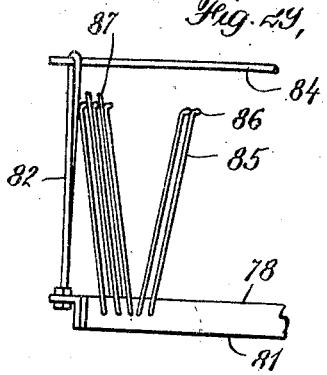
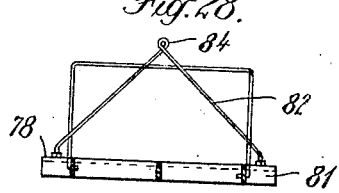
INVENTOR
Julius H. Gillis
BY Pennie, Davis, Marvin & Edmonds
his ATTORNEYS Patented Dec. 29, 1925.

1,567,048

UNITED STATES PATENT OFFICE.

JULIUS H. GILLIS, OF ELIZABETH, NEW JERSEY, ASSIGNOR, BY MESNE ASSIGNMENTS, TO ANACONDA SALES COMPANY, A CORPORATION OF DELAWARE.

APPARATUS FOR MAKING ROOFING ELEMENTS.

Application filed September 10, 1923. Serial No. 661,972.

*To all whom it may concern:*

Be it known that I, JULIUS H. GILLIS, a citizen of the United States, residing at Elizabeth, in the county of Union, State of New Jersey, have invented certain new and useful Improvements in Apparatus for Making Roofing Elements; and I do hereby declare the following to be a full, clear, and exact description of the invention, such as will enable others skilled in the art to which it appertains to make and use the same.

This invention relates to a process and apparatus for the manufacture of roofing elements, and more particularly elements which consist of a composition base of various materials such as cork, wood fibre, or asbestos products bound together by a suitable binder, or base compositions of the so-called asphalt roofing type provided with a protective metal layer applied to the surface thereof. Such elements may conveniently be made by depositing the metallic coating on the surface thereof by electrolytic processes, and this invention is directed to the provision of an improved process and apparatus by which such electro-deposition may be carried on.

The elements which are to be produced may be of varying forms, such as single or multiple shingles, tiles, strips, and the like, and ordinarily the metallic protective layer is applied over a portion of one surface thereof which will normally be exposed when the element is laid in place on the roof. Since the composition base is not an electric conductor, it is necessary to provide a conducting coating over which the metal is deposited, and this coating may consist of powdered graphite which is applied to the base and held in place thereon by a suitable adhesive. The bases so treated are next placed in an electrolytic tank and the metal deposited over the desired area by the usual steps of electro-deposition. Since these elements are to be produced in large quantities it is desirable to provide a process and apparatus by means of which a deposit of uniform thickness and quality may be made and apparatus for carrying on this step should be laid out so that it can be conveniently operated and so that the production of the elements may be carried on without interruption.

In electro-depositing a metallic coating on a base of the materials previously referred to, which is non-conducting and must be given a conducting coating, it is, of course, necessary to provide some means by which the plating current may be withdrawn from the coating and as such base materials have a somewhat irregular surface it is desirable that any contact member used for the above purpose should be pressed against the element with considerable force. Such contact devices must be adjusted in position against each element as soon as the latter is inserted in the electrolyte and unless special provision is made for handling these contact members efficiently, this operation consumes considerable time. In any electrolytic process of the type now under consideration, in which a great many articles of the same kind are treated and given a similar plating, it is desirable that the process be carried on in such a way that one workman may supervise the plating of many elements, and it is also desirable that electrolytic conditions should be the same in each plating operation.

According to the present invention, now to be described, I provide a process in which the elements are plated in separate electrolytic cells and I plate the elements while supporting them in spaced relation to the anode. These elements are held on a suitable support and are pressed against the support by means which include the negative terminal for withdrawing the plating current. I may use the anodes as a support, providing them with spacing members including contacts, against which the elements are pressed by weights; or else I may use the weight of the anode itself to provide the contact. In the latter arrangement I prefer to arrange the anodes in such a way that they may be swung into and out of operative position with relation to the elements and on each anode I mount a spacing member which is insulated from the anode and which carries a contact which is to bear against the element. This spacing member serves the further purpose of outlining the shape of the deposit and by masking parts of the anode the spacing member concentrates the deposit on those parts of the element where the coating is desired. In order that the process may be efficiently carried on, I provide a series of electrolytic cells by making use of a long tank in which there are barriers which form compartments. In each of these compartments or cells there is placed an anode and an element support and each of the anodes carries the weight and a spacing member of the type previously referred to. Movable along the tank is a conveyor which may conveniently be made in the form of a car running on a track. This car is provided with devices which are located in such a position as to engage the anodes successively as the car moves along and as the car passes each cell it moves the anode so as to swing the contact member away from the element. With the anode in this inoperative position the operator may remove the plated element and replace it with one unplated. The movement of the car in continuous, and when an unplated element has been placed in position the anode is released from the devices on the car, and swung back with the contacts against the element. The plating operation then begins and the car moves to the next cell where the operations are repeated.

By a suitable arrangement of the cells the electrolyte is circulated from one end of the tank to the other end in this way electrolytic conditions are uniform throughout the tank. Preferably the tank contains a sufficient number of compartments so that when the car has moved from one end to the other of the tank the elements at the start are finished and may be removed. The car, therefore, is run back to the front end of the tank, and in this way the process may be carried out without interruption. Preferably one operator takes care of two tanks which lie side by side with the car running between them, and the electrolyte is circulated through the tanks successively. With this process it is possible to secure uniform deposition of coatings of the same thickness on all of the elements treated, and the process may be carried on with great efficiency in a continuous manner.

In the accompanying drawings there is illustrated a convenient apparatus by means of which the process may be carried on, and this apparatus is designed for the production of multiple shingles, that is, shingles consisting of a rectangular base, one edge of which is provided with cut-outs defining portions of the size of an ordinary shingle, these cut-outs being so arranged that when the elements are laid in place on the roof in overlapping courses the appearance is that of the ordinary shingle roof. In these drawings, Figs. 1, 2 and 3 are elevational, sectional and plan views of the anode to be used, the section of Fig. 2 being taken on the line 2—2 of Fig. 1, Figs. 4, 5 and 6 are respectively elevational, end and top views of a weight which is to be mounted on the anode, Figs. 7, 8 and 9 are elevational, sectional and plan views of the anode with the weights in place, the section of Fig. 8 being on the line 8—8 of Fig. 7, Fig. 10 is a rear elevational view of the spacing or contact member, Fig. 11 is a plan view of the same, Fig. 12 is a rear elevational view of a modified form of the spacing or contact member, Fig. 13 is a section of the same, on the line 13—13 of Fig. 12, Fig. 14 is a plan view of the member illustrated in Fig. 12, Fig. 15 is a front elevational view, Fig. 16 is a detailed section on the line 14—14 of Fig. 12, Fig. 17 is a rear elevational view showing the anode, weights and spacing member assembled, Fig. 18 is a cross-section of the same on the line 16—16 of Fig. 17, Fig. 19 is a plan view of the assembly, Fig. 20 is a front elevation of the assembly, Fig. 21 is a plan view of an element which is to be given the metallic coating, Fig. 22 is a cross-section of an electrolytic cell, showing the element supported therein, Fig. 23 is a side view of an electrolytic tank with one side plate removed, showing a pair of anodes and elements in successive compartments with one anode in operative and the other in inoperative position, Fig. 24 is a plan view of the plated element, Fig. 25 is an end view of the same with the plating somewhat exaggerated as to thickness, Fig. 26 is a cross-sectional view of a pair of tanks, showing the anodes in place therein, and showing the car which runs between these tanks with a carrier mounted thereon, Fig. 27 is a side view of the several parts illustrated in Fig. 26, Fig. 28 is an end view of the carrier, Fig. 29 is a detail of the end portion of the carrier, and Fig. 30 is a view similar to Fig. 23, showing a detail of a modified anode assembly.

In these drawings the anode 30 is illustrated as consisting of a rectangular base member 31, having three tongues 32 extending from the upper edge thereof. The middle tongue 33 is somewhat longer than the other two, and has a groove 34 formed near the outer end thereof. This anode is preferably formed of cast metal, and consequently has a beveled face so that it may be readily withdrawn from the mold. Also the lower edge of the anode has a beveled surface 35 for a purpose which will later be described.

As has been stated, the particular apparatus here shown is designed for the production of multiple shingles of the three-unit type, and the finished element illustrated in Fig. 24 is shown to have a metallic coating 36 which lies along the edge carrying the cut-outs. As the elements are laid in overlapping courses in staggered relation, it is necessary, in order to insure that all exposed parts of the element will be protected by the metal, that the metallic coating should have extensions such as 37 which will lie beneath the cut-out portions of the elements of the course above. The deposit, therefore, has the irregular shape illustrated in Fig. 24, and to produce such a deposit uniformly the anode should have a corresponding shape. Such an anode is illustrated in Fig. 1, and it will be understood that if elements having metallic coatings of different outlines were to be produced the anode would be given the required outline.

As the anode is used in providing the contact pressure it is preferable to provide the anode with one or more weights 38, inasmuch as the carrying on of the process causes the anode to go into solution and during such consumption it would eventually become so thin as not to provide the desired pressure. The outline given the anode as shown in Fig. 1 also permits of a convenient mounting of such weights as are illustrated in Figs. 4, 5 and 6. Such a weight is preferably designed so as to fit between a pair of tongues 32 on the anode, and along its lateral edge has flanges which form a channel 39, into which a tongue is to enter. The weight may be provided with a handle 40 on its upper edge, and also has pairs of tongues 41 along the lower edge which serve to fit over the anode so that the weight is securely held in place. Such a weight may be made of a convenient material as iron or lead, and is treated with a protective coating of some sort, such as rubber varnish, so that the metal of the weight will not go into solution in the electrolyte. It is also desirable that the additional weight should be evenly distributed along the anode, and consequently with the anode illustrated in Fig. 1 it is desirable to make use of a pair of weights such as are shown in Fig. 7.

The spacing and contact member is illustrated in Figs. 10 and 11, and consists of a plate 42 which may be made of wood or of insulated metal. This plate has the same length as the length of the element to be plated, and is provided with a pair of lugs 43 by means of which it may be supported on an anode, these lugs fitting around the outside tongues of the anode. Along its lower edge the plate is provided with cutouts 44 which correspond to the outline of the deposit, as illustrated in Fig. 24. Also on its rear face the plate is provided with spacing ridges 45 which hold it in proper relation to the face of the anode. On its front face the plate is covered with a sheet of copper 46 which may be secured in place in any desired manner, and at the upper ends are terminals 46' which are electrically connected to this copper facing sheet.

The spacing and contact member 47 illustrated in Figs. 12, et seq., is in somewhat modified form and consists of a metallic sheet or framework 48, both faces of which are covered with insulating material 49, 49. The contact member has an irregular outline formed with cut-outs 50 along its lower edge so as to expose the tongues 32 projecting upwardly from the top edge of the anode. Along the outer edges of the outer cut-outs are flanges 51 which terminate in off-sets 52, these flanges serving to hold the spacing member in place on the anode, as is illustrated in Figs. 17 and 19. These flanges are held in place by means of metallic screws 53, the heads of which are covered by the insulating material 49. In the front face of each spacing member are contact strips 54 and in the member illustrated which is to be used in the production of the three-unit shingle, in which the metallic coating has three projecting tongues 37, there are three of these contact strips which have a form corresponding to the shape of the tongues 37. These contact-strips are mounted to be pressed against the conducting surface on the element so as to withdraw the plating current therefrom, and the contacts are electrically connected with the frame 48, which is provided at either end with terminals 55, with which the necessary electrical connections may be made. On the rear face of the spacing member there is provided a pair of projecting ridges 56 which serve to space the member from the weights, as is illustrated more clearly in Fig. 18.

It will be seen that when the anode is prepared for operation it is provided with a pair of weights, removably secured on its upper edge, and a spacing member is also removably secured to the anode and carries contact members on the surface opposite to that which lies against the anode. The assembled anode has considerable weight and when it is used in the manner presently to be described the contact members will be forced against the elements with a sufficient degree of pressure to produce a good contact.

In Fig. 21 there is illustrated the three-unit shingle element which is to be produced in the apparatus shown. The electrolytic tanks in which the deposition on these elements takes place are illustrated in Figs. 23 and 26, and these tanks are formed of wood, slate, or other material such as is ordinarily used for this purpose. Preferably if wood is used it will be provided with a sheathing to protect it from the action of the electrolyte. One convenient arrangement of the tanks is that illustrated in Fig. 26, in which a pair of tanks are mounted side by side on a suitable base 57. Each tank consists of a bottom, side, and end walls, and the tank is of a width corresponding to the length of an element. The bottom 58 of the tank is slightly inclined, as illustrated in Fig. 23, and disposed along the length of the tank in spaced relation, are partitions 59 which serve to form a series of compartments 60. Each of these compartments forms an individual cell in which a single element is to be plated, and preferably the partitions 59 will be inclined toward the high end of the tank, which will be referred to as the front end for convenience. The rear face of each partition serves as a support for the element to be treated and projecting from this face are pegs 61, spaced apart and of such size that an element may be mounted in place with these pegs projecting through the cut-out portions thereof. Formed in the rear face of each partition is one or more grooves 62 which extends vertically from the top edge of the partition to a point beyond the lower edge of the element, and when an element is in place on its supports the electrolyte 63 may flow over the edge of each partition down through the groove 62, out below the lower edge of the element, into the next compartment. In this way the electrolyte flows from the front to the rear end of the tank in a path which insures that the circulation will be complete and that there will be no spaces in which the electrolyte may become stagnant. In the bottom of each compartment is an anode support 64 provided with a suitable groove 65 in which the beveled edge 35 of the anode is to be placed, and along its front edge the member 64 has a channel 66 into which the lower edge of the element on its supports may enter. The groove 62 terminates below the top of the support 64 to produce the circulation above described. In the front edge of each partition there is a channel 67 which extends across the face of each partition to a length sufficient to permit the anode to enter therein when it is in the inoperative position.

In carrying on the process, an element will be placed on its support, as is illustrated in the compartment at the left in Fig. 23, the anode having been moved to the position against the channel 67 during this replacement. With the element on its support, the anode is then swung or tilted in the groove so that the contact member bears against the face of the element, and the tilt which is given the compartments causes the weight of the anode assembly to provide the desired pressure to insure a good contact. Suitable electric connections have previously been made with the anode and with the terminal of the spacing or contact member, and current flows from the anode into the cell through the electrolyte into the conducting coating on the element causing the deposition of the metal in the usual manner. This plating current travels through the conducting coating to the contact sheet, then to the negative terminal. The electrical connections for carrying on the deposition have not been illustrated but it is possible to connect a plurality of anodes and contact members in series, or in series parallel relation. The circuits which are used will depend on the supply of electrical energy which is available and will be determined by the other conditions of deposition.

In Fig. 26 there is illustrated a pair of tanks 68, 68, mounted side by side in spaced relation on a base, and between these tanks is a conveyor which is here illustrated as a car 69 running on a track. This car is of any convenient type and may be provided with a propelling means illustrated generally at 70 in the form of an electric motor, which is preferably geared so as to give the car a very slow movement. This car has a seat 71 for the operator at one end, and will, of course, be provided with suitable controls so that the operator may direct the movements of the car conveniently. Mounted on the bed of the car and extending to either side thereof over the electrolytic tanks, is a frame 72 which may be made of angle iron with the necessary bracing members.

Mounted on the frame of the car near either end thereof, so as to lie approximately over the center line of the tanks, are means for engaging the middle tongues of the anodes so as to swing the anodes to the upright position as the car moves. The means used for this purpose may take any convenient form, but as here illustrated, consist of a hook 73 pivotally mounted on the short arm of a bell-crank lever 74 which is pivotally mounted, as at 75, in an upright member 76 on the car framework. The long arm of the bell-crank is weighted as at 77. As the car begins to move from the front end of the tanks the hooks will engage the first pair of anodes and swing them to the upright position as the car moves. During this slow movement of the car the operator sitting on the seat will lift the plated elements from the compartments and substitute for them a pair of unplated elements. As soon as this is done he releases the hooks from the anodes and the latter swing back to their inclined position. The hooks drop down in the path of the next pair of anodes and as the car continues its movements the operations are repeated. With this arrangement the movement of the car, though slow, is continuous, and as each compartment is passed the anode therein is lifted to inoperative position, the elements removed, and the new ones inserted by the operator with a high degree of efficiency.

The elements which are to be treated in the electrolytic tank are handled in a carrier 78 which is preferably separated into a pair of compartments 79, 80, one of which, 79, is to carry a supply of untreated elements, the other, 80, to receive the finished products as they are removed from the tanks. This carrier consists of a base member 81 and end member 82, 82 which may be in the form of heavy wire bent to a convenient shape, and the central partition 83 which forms the compartments is of a similar construction. Extending between the end members is a rod 84 by means of which the carrier may be readily picked up. The elements which are to be treated will have been provided with a coating of conducting material before they are brought to the electrolytic tanks, and such a conducting coating may be formed by means of powdered graphite applied by the use of an adhesive. Inasmuch as any breaks in this coating would also produce a break in the plated coating, it is desirable that every precaution be taken to protect the elements prior to the electro-deposition. The carrier is, therefore, provided with a series of spacing members 85 in the compartment 79, and these spacing members may consist of loops of wire, the ends of which are inserted in apertures in the base member of the carrier. These loops are free to be swung in their mountings and at the upper end the wire is off-set as indicated at 86, Fig. 29. In loading the untreated elements indicated at 87, into the carrier, they are placed with their rear faces against the spacing members with a spacing member between each pair of elements and the off-set portions 86 of the spacing member serve to keep adjacent elements apart so that the conducting coating will be uninjured when the elements are being transported.

In Fig. 30 I have illustrated a somewhat modified form of anode assembly. In the preferred form of apparatus the elements are mounted on supports on the partition and the anodes have mounted on them weights and spacing members. When the element is being plated the anodes are swung so that the spacing members with the contacts therein press against the face of the elements and when elements are to be removed from the electrolyte the anode assemblies are moved clear of the elements. In Fig. 30 there is illustrated a form of cell in which the anodes are not moved and in this arrangement the partitions 88 dividing the tank into compartments, may be either inclined or vertical. In each compartment there is placed an anode 89 which lies in inclined position against the partition. Mounted on this anode is a spacing member 90 of a construction similar to the spacing member previously described, and having contact facing 91 formed in its upper face and being also provided with element supports 92 similar to the pegs 61. The element 93 is then placed in position on these supports, as shown in Fig. 30, and a weight 94 which rests in a groove 95 in the bottom wall of the tank is swung so as to press the element against the contact. This weight 94 projects above the anode and the partition and this is the part which is engaged by the hook on the car when this type of apparatus is used. The operation of the assembly is similar to that previously described with the difference, however, that the anode and the spacing member remain stationary, while the pressure which serves to secure a good contact between the contact facing and the conducting coating on the element is provided by means of the weight. The operation of the device is similar to that previously described.

The various steps in the process and the operation of the apparatus for carrying on the process will be clear from the foregoing description, which may be briefly summarized as follows:

In starting production the electrolytic tanks are provided with electrolyte of the desired strength and quality and the operator will mount a carrier with a full supply of untreated elements on the car. As the car moves along slowly the hooks engage anodes in pairs, one in each tank, and swing them to the inoperative or vertical position illustrated at the left in Fig. 23, An element is then placed in each compartment and the anodes swung to lie against the elements. The operator continues this filling of the compartments throughout the length of the tanks and the operation will consume such an amount of time that when the tanks are filled the car may be returned to the starting point and the elements in the first compartment are then ready for removal. A new carrier is then mounted on the car and the latter is again moved down the length of the tank. At each compartment the hooks will engage the anodes and move them to the inoperative position. The operator then removes the finished elements from corresponding compartments in each tank, places the finished elements in one compartment of the carrier, and replaces them with untreated elements from the other compartment. This operation is carried on throughout the length of the tanks, and thereafter the production is carried on without interruption. The electrolyte is pumped from the lower end of the tank to the first compartment, or, when the tanks are used in pairs, the electrolyte may be caused to circulate through the tanks successively. The electrolyte entering the first compartment flows over the partition and down through the groove beneath the element into the next compartment, then upwardly and over the second partition, in this way producing the circulation through all of the compartments and through all parts of each compartment. This electrolyte may be periodically withdrawn and refreshed, as may be required. The anodes are gradually consumed during the plating operation, and when too thin for further use are removed and the weights and spacing member mounted on another new anode, which is then placed in the particular compartment. This operation may be quickly carried on so that the process is practically uninterrupted. Inasmuch as the electrolytic conditions are the same throughout all the compartments of both tanks, and the elements are subjected to deposition for similar periods of time, the metallic deposit produced is of uniform quality and of uniform thickness, throughout all the elements treated. With the layout described, one operator may take care of a great number of cells in an efficient manner.

While the apparatus here illustrated is designed particularly for the production of three-unit shingles, it is clear that it may be used for elements of any desired shape or form. For the best results, however, the anodes should be of a shape corresponding to the shape of the metallic coating to be deposited, and the design of the weights and the spacing member will depend, of course, on the outline of the anode. The conducting coating which is provided on the elements is preferably applied so as to follow the general outlines of the desired deposited metal and the spacing member serves to assist in producing this outline, inasmuch as it masks the anode, except over those areas which correspond to the area to be plated.

The form of contact member illustrated in Fig. 10 is preferred by reason of the fact that it produces a deposit of the metal on the roofing element which has a clean edge. This contact member, as has been previously described, has its entire front face covered with a sheet of metal which lies against the face of the element when the latter is in place in the cell. It has been found that by reason of the metal facing having a greater conductivity than the graphite, no plating occurs on the element over those portions that are masked by the contact plate. The solution which enters between the faces of the element and the plate causes a slight deposition to occur on the contact facing but since the metal conducts electricity more rapidly than does the graphite any deposition is confined to the metal and the graphite coating keeps clean. Consequently it is not necessary to apply the graphite coating with great care along the edges of the area over which the deposit is to be made. The form of contact member illustrated as a modification in Fig. 12, et seq, is in general satisfactory for the purposes and produces an excellent contact throughout the contact strips, and this form of contact member is useful where it is desired to concentrate the contact pressure over a small area rather than throughout the face of the element. The contact member shown in Fig. 10, however, has an added advantage in that it may be used to center the element on its support, thus making it unnecessary to provide the peg supports illustrated in Fig. 23. This feature is of great advantage in producing elements which do not have the cut-outs such as occur in the case of a three-unit shingle. In using the preferred form of contact member for this purpose it will be given a length exactly that of the element to be plated, and will be of such height that when an element lies against the partition with its upper edge in registry with the upper edge of the contact member, the latter will expose only that area of the element which is to receive the coating. In mounting the elements in the cells when no pegs are provided the operator will place the element against the face of the partition and move the anode with its contact member so as to bear against the element. Just before the contact member strikes the element, however, the latter will be placed with its upper edge in the desired position and the weight of the anode assembly will then hold the element in the desired position during the deposition.

I claim:

1. Apparatus of the class described comprising an electrolytic tank having a plurality of anodes therein, a support for the element to be plated adjacent each anode, contact means for bearing against an article on the support to withdraw the plating current therefrom, and means movable along the tank and adapted to release the contact means successively from the elements.

2. Apparatus of the class described comprising an electrolytic tank having a plurality of anodes therein, a support for the element to be plated adjacent each anode, a contact adapted to bear against the element on the support to withdraw the plating current therefrom, means for pressing the article and contact together, and means movable along the tank and adapted successively to render the means first mentioned inoperative.

3. Apparatus of the class described, comprising an electrolytic tank divided into a series of compartments by partitions, an anode in each compartment, a support for the element to be plated located in each compartment, adjacent the anode, contact means adapted to bear against the element to withdraw the plating current therefrom, means in each compartment adapted to press the element and contact together, and a conveyor movable along the tank and adapted to engage said means successively as it moves to render the latter inoperative.

4. Apparatus of the class described, comprising an electrolytic tank having a plurality of anodes therein, and means movable along the tank and adapted to move the anodes successively to a different position.

5. Apparatus of the class described comprising an electrolytic tank having a plurality of anodes therein, normally lying in inclined position, and means movable along the tank and adapted to move the anodes successively to a different position.

6. Apparatus of the class described comprising an electrolytic tank having a series of anodes therein, a conveyor movable along the tank and provided with means for successively engaging the anodes and moving them to a different position as the conveyor moves and a carrier on the conveyor for holding a supply of unplated articles and for receiving the plated articles as they are finished.

7. Apparatus of the class described comprising an electrolytic tank divided into a series of compartments by partitions, an anode in each compartment, and means movable along the tank and adapted to move the anodes successively to a different position within the compartments.

8. Apparatus of the class described comprising an electrolytic tank divided into a series of compartments by means of spaced partitions, a support for an element to be plated in each compartment, an anode in each compartment normally lying in inclined position, and means movable along the tank and adapted to engage the anodes successively and move them away from the element supports.

9. Apparatus of the class described comprising an electrolytic tank having a plurality of compartments therein, formed by spaced partitions, an anode in each compartment, normally lying in inclined position, and a car movable along the tank and provided with means for swinging the anodes successively about a horizontal axis as the car moves.

10. Apparatus of the class described comprising an electrolytic tank provided with a series of anodes in spaced relation throughout its length, a car movable along the tank and provided with a portion extending thereover, and means mounted on the extending portion for engaging the anodes successively, and for moving such anodes to a different position as the car moves.

11. Apparatus of the class described comprising an electrolytic tank provided with a series of anodes in spaced relation, a car movable along the tank, and provided with a frame extending thereover, means mounted on the frame for engaging the anodes successively and moving them to a different position as the car moves, and a carrier mounted on the car for holding a supply of unplated elements and for receiving the plated elements.

12. Apparatus of the class described comprising an electrolytic tank provided with a plurality of anodes in spaced relation, a car movable along the tank, propelling means on the car and means mounted on the car for successively engaging the anodes in the tank and for moving them to a different position as the car moves.

13. Apparatus of the class described comprising a pair of electrolytic tanks provided with a series of anodes, means movable along the tanks for successively engaging the anodes in pairs, one in each tank, and for moving these anodes to a different position.

14. Apparatus of the class described comprising an electrolytic tank separated into a series of compartments by partitions, an element support in each compartment, an anode in each compartment, adapted to hold the element to be plated on its support, a car movable along the tank, and means on the car for engaging the anodes successively and for moving them clear of the element as the car moves.

15. Apparatus of the class described comprising an electrolytic tank separated into a series of compartments by partitions, a support for the element to be plated in each compartment, an anode in each compartment, insulated contact means for bearing against the element when the anode is in operative position, a car movable along the tank and means on the car for successively moving the anodes away from the elements.

16. Apparatus of the class described comprising an electrolytic tank, a series of supports for the elements to be plated mounted within the tanks, an anode associated with each support, and normally lying in inclined position, each anode being provided with means for bearing against the element, and a car movable along the tank and provided with means for successively engaging the anodes and swinging them clear of the elements as the car moves.

17. In apparatus of the class described, an electrolytic tank having a series of supports for an element disposed therein, and an anode associated with each support and adapted to be moved into and out of operative position.

18. In apparatus of the class described, an electrolytic tank having a series of compartments formed therein by inclined partitions, a support for the element to be plated in each compartment, and an anode in each compartment normally lying in a plane substantially parallel to the plane of the support, each anode being freely movable out of such plane.

19. In apparatus of the class described, an electrolytic tank divided into a series of inclined compartments by spaced partitions, a support for the element to be plated mounted on each partition, and an anode in each compartment normally lying with its axial plane parallel to the plane of the support, this anode being tiltable to a different position.

20. In apparatus of the class described, an electrolytic tank divided into a series of compartments by means of spaced partitions, a support for the element to be plated on each partition, an anode in each compartment, contact means on each anode and means on each anode for pressing the element and contact means together when the anode is in operative position.

21. In apparatus of the class described, an electrolytic tank provided with a plurality of supports for the elements to be plated, an anode associated with each support and movable into and out of operative position, and insulated contact means on each anode to withdraw the plating current from the element.

22. In apparatus of the class described, an electrolytic tank divided into a series of compartments by means of spaced partitions, a support for the element to be plated in each compartment, and an anode in each compartment adapted to be moved into and out of operative position.

23. In apparatus of the class described, an electrolytic tank divided into a series of compartments by means of spaced, inclined partitions, a support for the element on each partition, and an anode within each compartment movable into and out of operative position, and provided with contact means adapted to bear against the element on its support when the anode is in operative position.

24. In apparatus of the class described, an electrolytic tank having an inclined bottom, a series of partitions disposed in the tank, in inclined relation, and provided with supports for the article to be plated, and a groove formed in that face of each partition upon which the support is mounted.

25. In apparatus of the class described, an electrolytic tank having an inclined bottom, and provided with a series of spaced partitions, each partition having a groove on the face toward the lower end of the tank.

26. In apparatus of the class described, an electrolytic tank having an inclined bottom and provided with a series of spaced partitions and a groove in the face of each partition toward the lower end of the tank, extending substantially from the top to the bottom of said partition.

27. In apparatus of the class described, the combination of an anode, a weight mounted on the anode, and a spacing member mounted on the anode.

28. In apparatus of the class described, an anode, a weight removably mounted near the upper end thereof, and a spacing member mounted on the anode and extending beyond one face thereof.

29. In apparatus of the class described, an electrolytic tank having a plurality of compartments therein, a support for an element to be plated in each compartment, an anode in each compartment movable toward and away from the support and a spacing member mounted on the anode adapted to bear against the element to be plated when the anode is in operative position.

30. In apparatus of the class described, an electrolytic tank, a plurality of supports for the elements to be plated therein, an anode associated with each support and movable into and out of operative position, a spacing member mounted on each anode, and a contact located on the face of the spacing member and bearing against the face of the element when the anode is in operative position.

31. In apparatus of the class described, a spacing member for use with a movable anode and comprising a plate a contact mounted on the face thereof, and means for mounting the spacing member on the anode.

32. In apparatus of the class described, a spacing member for use with a movable anode and comprising a contact mounted on an insulated plate and means on the plate for mounting the member on the anode.

33. In apparatus of the class described, a spacing member for use with a movable anode, and comprising a contact mounted on an insulated plate, a terminal connected electrically with the contact and flanges on the plate adapted to hold the member on the anode.

34. In apparatus of the class described, a spacing member for use with an anode movable into and out of operative position, having its edge conforming to the shape of the deposit to be made, and having a contact on one face thereof.

35. In apparatus of the class described, the combination of an anode, a weight removably mounted thereon, a spacing member removably mounted on the anode and extending beyond one face thereof, and means on the anode by which said anode may be moved into and out of operative position.

36. In apparatus of the class described, a spacing member for use with an anode movable into and out of operative position having means for removably mounting the same on said anode along one face thereof, and having cut-outs formed therein to expose portions of the anode.

37. In apparatus of the class described, an electrolytic cell having inclined side walls, a groove in the bottom of the cell and an anode mounted in the groove and movable toward and away from one of said side walls.

38. In apparatus of the class described, the combination with an electrolytic tank having a plurality of anodes therein movable into and out of operative position, of a car movable along the tank and having a frame extending thereover and a hook mounted on the frame and adapted to engage the anodes successively as the car moves.

39. In apparatus of the class described, the combination with an electrolytic tank provided with a series of anodes movable into and out of operative position, and a car movable along the tank and having means adapted to engage the anodes successively to move them as the car moves, of a carrier adapted to be mounted on the car and divided into two compartments and having a plurality of spacing members in one of said compartments.

40. In apparatus of the class described, the combination with an electrolytic tank provided with a series of anodes movable into and out of operative position, and a car movable along the tank and having means adapted to engage the anodes successively to move them as the car moves, of a carrier adapted to be mounted on the car and comprising a base and end members and a plurality of spacing members pivotally mounted in the base and extending upwardly therefrom.

41. In apparatus of the class described, the combination with an electrolytic tank provided with a series of anodes movable into and out of operative position, and a car movable along the tank and having means adapted to engage the anodes successively to move them as the car moves of a carrier mounted on the car and comprising a base, end members mounted thereon, and a plurality of U-shaped spacing members pivotally secured in the base and provided with off-set portions along their upper edges.

42. In apparatus of the class described, the combination with an electrolytic tank provided with a series of anodes movable into and out of operative position, and a car movable along the tank and having means adapted to engage the anodes successively to move them as the car moves, of a carrier comprising a base, end members mounted thereon, a central partition secured to the base and dividing the carrier into two compartments, and a plurality of spacing members attached to the base in one of said compartments.

43. A process for the manufacture of roofing elements which comprises mounting an insulated contact member on an anode in an electrolytic cell, supporting an element having a conducting coating in said cell, moving the anode to cause it to press the contact member against said conducting coating and causing current to flow from said anode into said cell while withdrawing current from said contact member.

44. A process of manufacturing roofing elements of the class described which comprises electrolytically depositing metal over a conducting material disposed over the face of an element supported in an electrolytic cell while withdrawing current from said conducting material by means of a contact member held against said material by the weight of the anode.

45. A process of manufacturing roofing elements of the class described, which comprises supporting an element in spaced relation to an anode in an electrolytic cell, pressing a contact against the element in such position, causing a current to flow into said cell from the anode and out of said cell through the contact member to plate the element and releasing the pressure when the deposition has been carried on to the desired extent.

46. In apparatus of the class described, an electrolytic cell having an anode supported on the bottom wall thereof and movable toward and away from one of the side walls of the cell.

47. In apparatus of the class described, a spacing member for use with an anode movable into and out of operative position, and comprising a conducting framework, an insulating coating covering the framework, a contact electrically connected with the framework, and projecting beyond the coating and a terminal projecting beyond the coating and electrically connected with the framework.

48. In apparatus of the class described, a spacing member for use with an anode movable into and out of operative position, and comprising a conducting framework, an insulating coating therefor, insulated means for mounting the member on an anode, a contact extending beyond the surface of the coating and electrically connected with the framework, and a terminal electrically connected with the framework.

49. In apparatus of the class described, a spacing member for use with an anode movable into and out of operative position and comprising a conducting framework, an insulating coating therefor, a contact extending beyond the face of said coating, and conforming to the shape of the deposit to be made, said contact being electrically connected with said framework, and insulated means for removably mounting said member on an anode.

In testimony whereof I affix my signature.

JULIUS H. GILLIS.